United States Patent [19]

Jenkins

[11] Patent Number: 4,571,297
[45] Date of Patent: Feb. 18, 1986

[54] BLADDER PUMP

[76] Inventor: Jerold D. Jenkins, 850 Vindicator Dr., Suite B 212, Colorado Springs, Colo. 80919

[21] Appl. No.: 686,733

[22] Filed: Dec. 26, 1984

[51] Int. Cl.⁴ .............................................. C02F 5/00
[52] U.S. Cl. .................................... 210/101; 210/206; 210/416.1; 55/233
[58] Field of Search ............... 210/101, 137, 191, 206, 210/257.1, 257.2, 350, 351, 416.1, 416.2, 416.3, 167, 169; 55/90, 233; 222/386.5

[56] References Cited

U.S. PATENT DOCUMENTS

| | | | |
|---|---|---|---|
| 2,456,524 | 12/1948 | Meincke, Jr. | 210/257.2 |
| 2,926,747 | 3/1960 | Wright et al. | 55/233 |
| 3,493,496 | 2/1970 | Bray et al. | 210/257.2 |
| 3,836,335 | 9/1974 | Eddes | 210/257.2 |

Primary Examiner—John Adee
Attorney, Agent, or Firm—Harvey B. Jacobson

[57] ABSTRACT

A closed container of liquid is provided and operatively associated with a reservoir of water in a manner such that each time an intermittently actuated pump is actuated to pump water from the reservoir a predetermined amount of liquid is pumped from the container into the reservoir. The container has a bladder disposed therein and an outlet, separate from the bladder, for liquid to flow from within the container, exteriorly of the bladder, to the reservoir. The bladder includes an inlet and a water dispensing structure is operatively associated with the discharge line from the pump to dispense a predetermined amount of water from the discharge line of the pump into the bladder each time the pump is actuated, thereby causing an equal amount of liquid to be displaced from within the container exteriorly of the bladder into the reservoir.

6 Claims, 2 Drawing Figures

U.S. Patent    Feb. 18, 1986    4,571,297
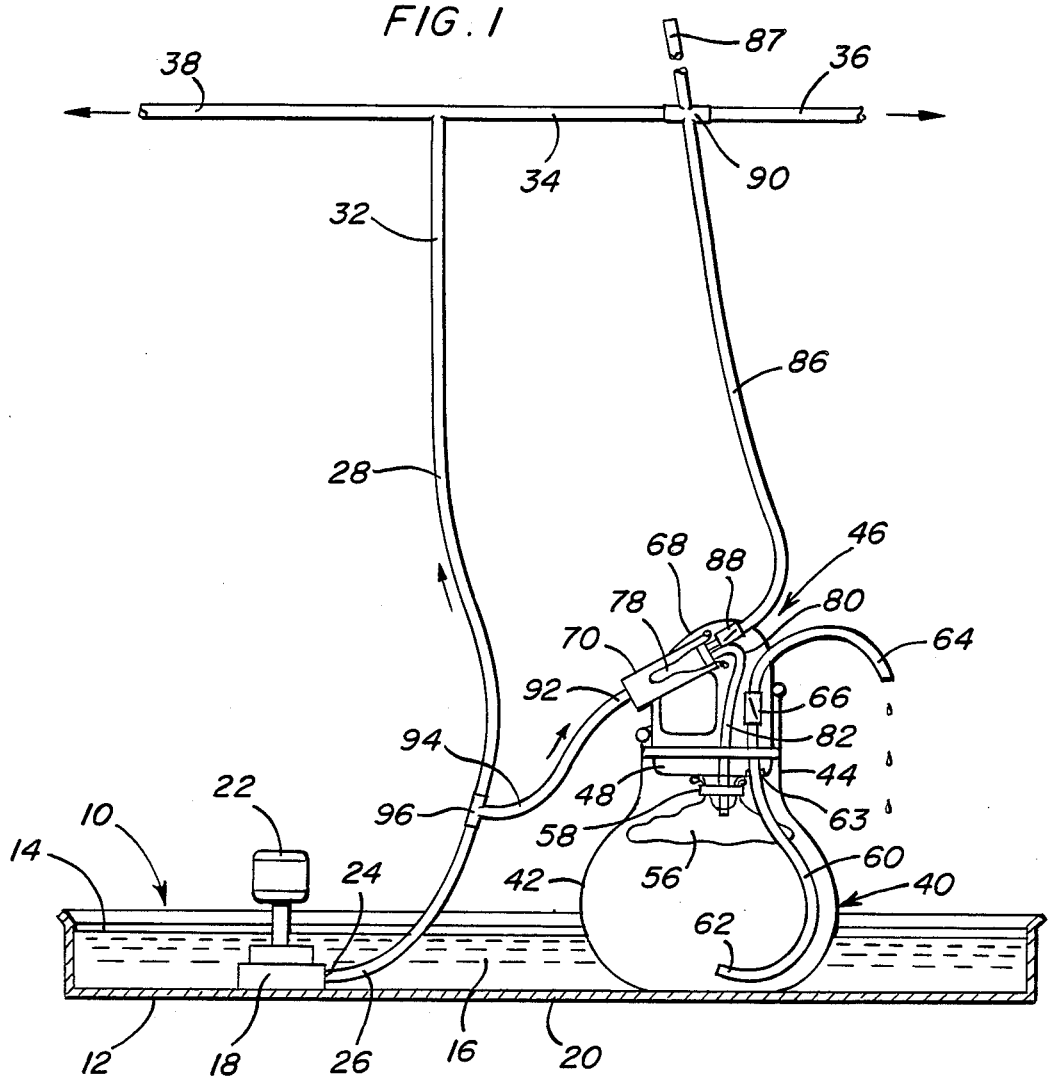
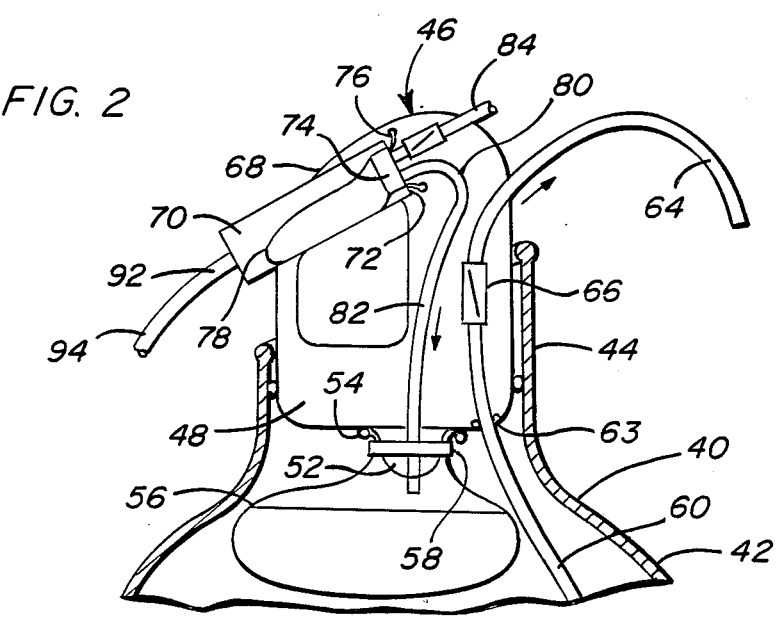

BLADDER PUMP

BACKGROUND OF THE INVENTION

1. Field of the Invention

When an evaporative cooling unit is provided, air is pumped through water absorptive filters to which water from a suitable source, such as a reservoir, is pumped at a slow rate in order to maintain the filters moist. Of course, when there is no demand for the cooling unit to operate, the system remains in a ready condition without water being pumped to the filters. However, whenever a demand for cooling causes the evaporative cooler to be actuated, a small flow of water to the filters is provided in order that the latter may be moistened. A major problem with an evaporative cooling unit is that as it is used a solid substance, usually calcium carbonate, builds up on the filters or pads as a result of water being evaporated from the filters or pads. The build up of calcium carbonate on the filters or pads greatly reduces the wetted surface area of the pads over which air may be flowed and the efficiency of the cooling unit is reduced appreciably.

In order to prevent the build up of calcium carbonate on the filters or pads of an evaporative cooling unit, a liquid chemical is added into the supply of water for the filters or pads and the chemical added to the water controls the pH of the water and thereby substantially prevents the build up calcium carbonate on the filters or pads.

2. Description of Related Art

Various different forms of apparatus for intermittently dispensing measured quantities of fluids heretofore have been provided such as those disclosed In U.S. Pat. Nos. 1,979,605, 2,505,798, 2,529,937, 2,876,787, 2,960,999, 3,220,435, 3,521,671 and 3,720,230, Canadian Pat. No. 573,875 and British Pat. No. 845,345. However, these previously known forms of apparatus are not capable of performing the intended function of the instant invention in the improved manner accomplished thereby.

SUMMARY OF THE INVENTION

The bladder pump of the instant invention is actuated by water pressure, such as that which is experienced in the discharge line of the water pump of an evaporative cooling unit and is operative, each time the intermittently actuatable pump is placed into operation, to cause a predetermined amount of liquid chemical to be discharged into the water reservoir from which water is pumped to the filters or pads.

The main object of this invention is to provide a structure, actuable in response to operation of a water pump, to pump a predetermined quantity of liquid from a container therefor to a point of use.

Another object of this invention, in accordance with the immediately preceding object is to provide a structure whereby the amount of liquid pumped from the container at each actuation of the associated water pump may be readily varied.

Another important object of this invention is to provide a structure in accordance with the preceding objects constructed in a manner such that the supply of liquid therefor may be readily replenished.

A final object of this invention to be specifically enumerated herein is to provide a system in accordance with the preceding objects which will conform to conventional forms of manufacture, be of simple construction and easy to use so as to provide a device that will be economically feasible, long lasting and relatively trouble free in operation.

These together with other objects and advantages will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of a water pumping system designed for pumping water to evaporative filters or pads of an evaporative cooling unit and with the bladder pump of the instant invention operatively associated with the discharge line for the water pump to displace a predetermined quantity of liquid from a container therefor into the water reservoir from which water is being pumped each time the pump is actuated; and FIG. 2 is an enlarged fragmentary vertical sectional view taken substantially upon a plane passing through the upper portion of the liquid container illustrated in FIG. 1.

DESCRIPTION OF THE PREFERRED EMBODIMENT

Referring now more specifically to the drawings, the numeral 10 generally designates the water pumping system for an evaporative cooling unit. The system 10 includes a shallow reservoir 12 to which water from a suitable source thereof may be supplied in any convenient manner (not shown) so as to maintain the level 14 of the water 16 within the reservoir 12 between predetermined upper and lower limits.

The system 10 further includes a water pump 18 positioned on the bottom wall 20 of the reservoir 12 and the pump is driven by any suitable motor 22.

The pump 18 includes an inlet (not shown) and an outlet 24 to which the inlet end 24 of a delivery line 28 is connected. The delivery line 28 includes a header line 34 having opposite end portions 36 and 38 for discharging water onto evaporative filters or pads (not shown).

It is to be understood that the motor 22 may be under the control of a thermostat which also controls a motorized blower (not shown) for pumping air over the evaporative filters or pads of the cooling unit.

The bladder pump of the instant invention is referred to in general by the reference numeral 40 and includes an open top container 42 disposed within the reservoir 12 resting upon the bottom wall 20. The container 42 includes a large diameter open neck 44 and a handle assembly referred to in general by the reference numeral 46 is frictionally received within the neck 44 and comprises a fluid-tight closure therefor. The handle assembly includes a cylindrical lower end portion 48 which is telescoped downwardly into the neck 44 and includes a circumferential sealing ring 50 sealingly engaged with the inner surface of the neck 44. In addition, the lower end portion 48 includes a hollow downwardly projecting neck 50 having the inlet neck 54 of a flexible bladder 56 clamped tightly thereabout in fluid-tight engagement therewith by means of any suitable lamp assembly 58.

A discharge line 60 has its inlet end 62 disposed within the lower end of the container 42 and the outlet end portion of the discharge line 60 extends upwardly from the lower portion of the container 42 and passes through a lower wall portion of the lower end portion 48 of the handle assembly 46 as at 63 in fluid-tight sealed engagement with the lower end portion 48. The outlet end of the delivery line 60 then passes upwardly through the intermediate portion of the handle assembly 46 and projects outwardly from the latter and is curved downwardly as at 64. In addition, the delivery line 60 includes a oneway check valve 66 which allows liquid to flow from the inlet end 62 upwardly through the discharge line 60 and out the outlet end of the line 60, but prevents downward flow of liquid in the discharge line 60.

The handle assembly 46 includes an upper hollow portion 68 which defines a handgrip and which encloses a major portion of a second smaller generally cylindrical container 70. The container 70 is open at one end as at 72 and is closed by a removable stopper 74 having the open neck 76 of a second smaller bladder 78 disposed within the container 70 secured thereover. The stopper 74 has a pair of bores (not shown) formed therethrough and the inlet end 80 of a first line 82 is sealingly fitted in one of the bores and the discharge end 84 of a second line 86 is sealingly secured in the other bore, the line 86 having a check valve 88 therein.

The open end 87 of the line 86 is connected into the distribution line 36 by a fitting 90. The outlet end of the line 82 extends downwardly through the hollow neck 52 and into the bladder 56, the outlet end of the line 82 being in fluid-tight sealed engagement with the lower portions of the hollow neck 52 through which it extends. Also, the end of the container 70 remote from the stopper 74 has a first end 92 of a line 94 opening thereinto in fluid-tight engagement therewith and the other end of the line 94 is communicated with the delivery line 28 by a T-fitting 96. The inlet end 87 of line 86 extends upwardly to an elevation above the header line 34 sufficient to overcome the normal pressure in header line 34. Thus, the inlet end 87 of line 34 is open to the ambient atmosphere.

In operation, a quantity of liquid chemical is placed within the container 42 with the bladder 56 in a substantially fully collapsed state. Then, each time operation of the pump 18 is terminated, water within the delivery line 28 flows backwardly down the latter and into the pump 18 and down through the line 86, the check valve 88 and into the small bladder 78. Further, water flows from within the container 70 outwardly of the bladder 78 through the line 94 and down into the line 28 through the T-fitting 96. This will, of course, cause a quantity of water from the line 86 to enter the bladder 78. Then, during the next cycle of operation of the pump 18, water is pumped from the pump 18 through the line 28 to the header 34 and through the line 94 into the container 70 exteriorly of the bladder 78. Inasmuch as water cannot flow from the bladder 78 through the check valve 88 and into the line 86, the pressure of water within the container 70 exteriorly of the bladder 78 forces the water from within the bladder 78 outwardly through the line 82 and into the bladder 56. Of course, inasmuch as the container 42 is completely full of liquid chemical, the pumping of water from the bladder 78 into the bladder 56 causes an equal volume of liquid chemical to be forced from within the container 42 exteriorly of the bladder 56 through the delivery line 60 from where the liquid chemical may drop into the water 16 within the reservoir 12. Of course, each time operation of the pump 18 is terminated, the bladder 78 is again filled with water from the line 86 preparatory to that water being expressed from the bladder 78 and into the bladder 56 on the next subsequent operation of the pump causing water to be pumped into the container 70 exteriorly of the bladder 78.

It is to be noted that the bladder pump of the instant invention may be used in conjunction with any apparatus which causes a fluid pump to be intermittently operated and that the bladder pump 40 is not designed solely for use in conjunction with evaporative cooling units.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is an follows:

1. In combination, a liquid flow system including a reservoir, an intermittently operable pump including an outlet having the inlet end of a pressure delivery line connected thereto and an inlet for receiving liquid from said reservoir, a repeating cyclic liquid dispensing system including a first hollow container of a given volume of liquid and fluid pressure actuatable dispensing means operatively associated with said container and said pressure delivery line operative to automatically dispense a predetermined fractional amount only of said given volume of liquid from said first container into said reservoir in response to each operation of said pump for at least a predetermined minimum time period and the resultant discharge pressure of liquid in said delivery line throughout said minimum time period, said dispensing means including a hollow collapsible bladder disposed in said first container for displacing liquid from within said first container in response to an equal amount of liquid being pumped into said bladder, said dispensing means further including a closed second hollow container having a second hollow collapsible bladder disposed therein and a flow line communicating the interior of said second bladder with said delivery line for receiving liquid from said delivery line by gravity upon termination of operation of said pump, said flow line having one-way check valve means operatively associated therewith, a discharge line having opposite ends communicated with the interiors of said bladders, and a gravity flow return line having opposite ends communicated with said pressure delivery line and the interior of said second container exteriorly of said second bladder, said second container being elevated above said reservoir.

2. The combination of claim 1 wherein said pressure delivery line extends upwardly to an elevation above said containers and opens into an elevated header line, said flow line opening into said header line.

3. The combination of claim 2 wherein said flow line and gravity flow return line are flexible and said second container is stationarily supported from a closure structure, the first container including an outlet neck portion, said closure structure being removably supported from said outlet neck portion and forming a fluid-tight closure therefor.

4. The combination of claim 1 wherein the second container is supported from a closure structure for the first container and comprises a portion of a handle defining area of said closure structure.

5. The combination of claim 1 including a delivery line having an inlet end opening inwardly into said first container through a closure therefore and an outlet end positioned to discharge liquid therefrom into said reservoir.

6. The combination of claim 1 wherein said reservoir comprises a shallow upwardly opening pan-type reservoir and said first container is suported within said reservoir from the bottom wall thereof.

* * * * *